E. D. CLARK.
FRUIT SORTING OR GRADING APPARATUS.
APPLICATION FILED AUG. 2, 1920.
1,356,852.
Patented Oct. 26, 1920.
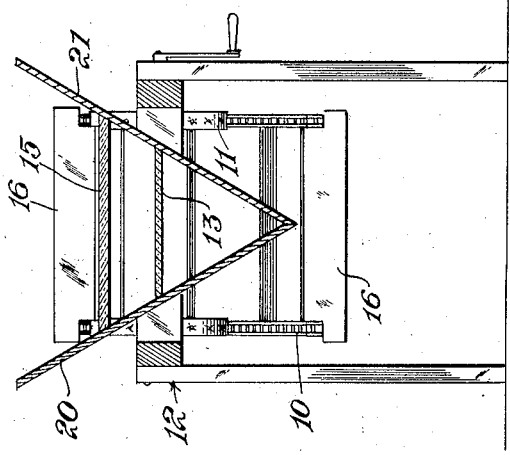
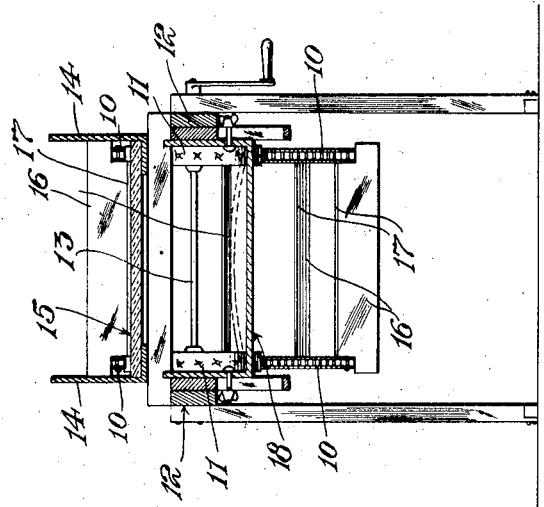
Inventor
Ernest D. Clark
By Thomas R. Harmer
Attorney

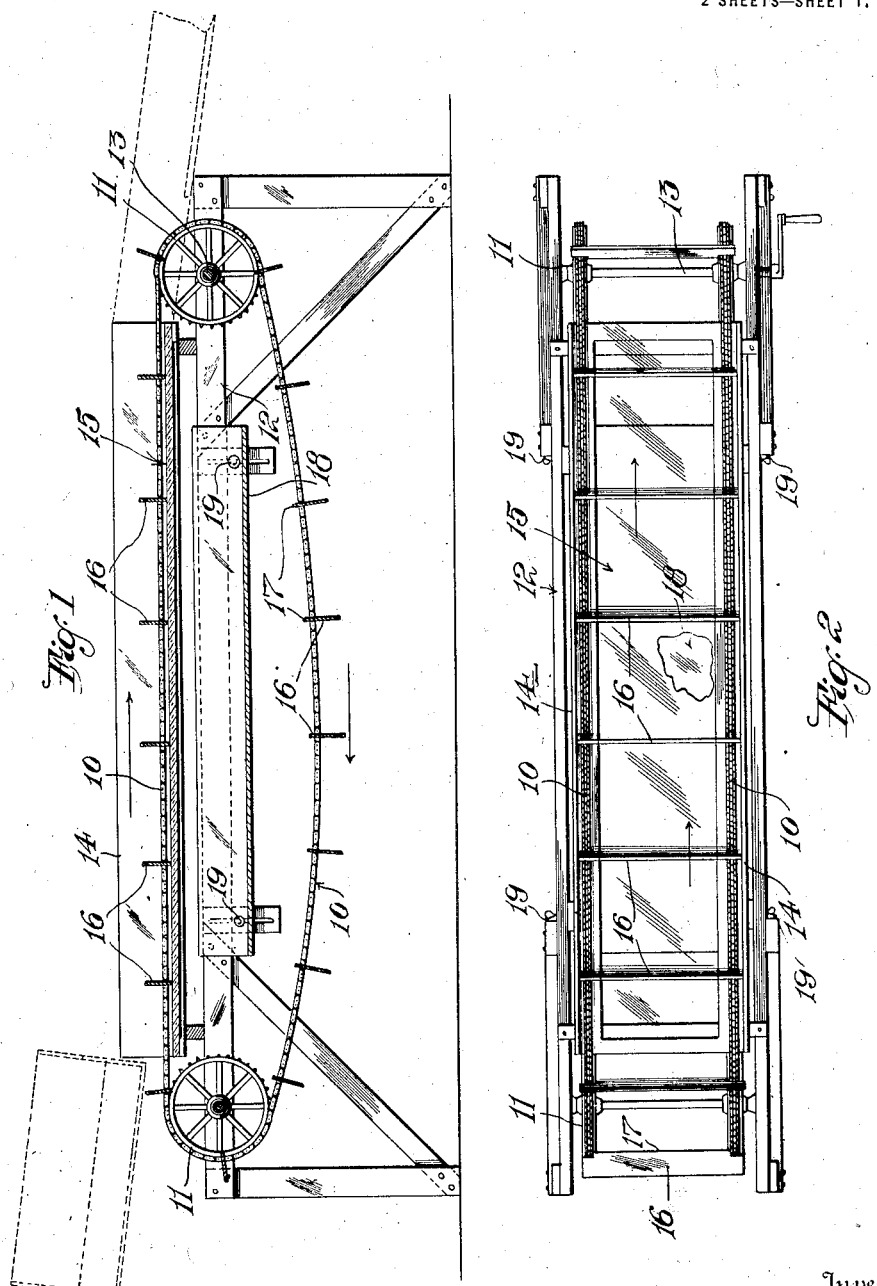

UNITED STATES PATENT OFFICE.

ERNEST D. CLARK, OF HARRISONBURG, VIRGINIA.

FRUIT SORTING OR GRADING APPARATUS.

1,356,852.   Specification of Letters Patent.   Patented Oct. 26, 1920.

Application filed August 2, 1920. Serial No. 400,602.

*To all whom it may concern:*

Be it known that I, ERNEST D. CLARK, a citizen of the United States of America, residing at Harrisonburg, in the county of Rockingham and State of Virginia, have invented certain new and useful Improvements in Fruit Sorting or Grading Apparatus, of which the following is a specification.

The hereinafter described invention relates generally to apparatus for grading or sorting articles while applicable for use in the grading or sorting of fruit or vegetables generally, is designed for use more particularly for apples, peaches and pears, and the object thereof is to facilitate the operation of sorting or grading of the fruit or vegetables as moved past the operator or operators situated alongside the apparatus for the removal of the bad, bruised or damaged fruit or vegetables from the stream of fruit.

In the accompanying drawings I have illustrated the preferred form as well as a modification of the invention, it being, however, understood that no limitation is necessarily made to the precise structural details therein exhibited, but that changes, alterations and modifications within the scope of the claims may be resorted to when desired.

The invention contemplates the arrangement of a conveyer for propelling the fruit over a screen or over a transparent glass beneath or beside which is arranged a reflector or reflectors, so that the operator may see the nearer portion of the fruit by direct vision and the reverse part in the reflected image, the object being to save complicated processes of turning the fruit now resorted to, which increase cost and are likely to cause more or less bruising of the fruit. The preferred form employs a single reflector while a modified form uses two reflectors set at an angle of about 60° and shows two images in the reflector set opposite the operator.

To comprehend the invention reference should be had to the accompanying drawings wherein:

Figure 1 is a vertical longitudinal sectional view of the improved sorting or grading apparatus showing the preferred form, Fig. 2 is a top plan view of the same, Fig. 3 is a transverse sectional view through the upper portion thereof.

Fig. 4 is a transverse section illustrating a modified form.

In Figs. 1 to 3 inclusive endless linked conveyer chains or belts 10 operate in sets of two (or more) around drums or sprockets 11 which are journaled in, and supported by, a frame 12. Either sprockets 11 or drums may be used the shaft 13 of one pair having rotation imparted thereto from any suitable source of outside power as for instance by a hand crank, by means of a foot treadle or by a belt pulley (not shown).

Guard rails 14 extend along both sides of the upper portion of frame 12 and form between them the runway along which the fruit is conveyed although in the double reflector style constituting a modified form the guard rails are replaced in whole or in part by the reflectors.

The bottom of the runway either for the entire length or for a suitable portion consists of a sash into which a transparent glass 15 is set flush so that the fruit passes over it without being bruised or obstructed. If desired transparent strips running longitudinally may be substituted for the solid glass or a screen of suitable mesh may be used in place of glass.

Fastened to the conveyer chains 10 and extending from one to the other in such manner as to sweep the fruit along the runway are pushers 16 which divide the conveyer into compartments of the proper size. These pushers are set at appropriate intervals depending on the kind and size of fruit to be graded. The pushers may be made of metal or of transparent material, and to the bottoms of the pushers may be fastened pads 17 of felt or other suitable material for the purpose of keeping the floor of the runway clean and transparent. In case the floor is of screen, brushes are utilized.

In the preferred form, a reflector 18 is located below the transparent bottom 15 of the runway which shows the images of the lower hemispheres of the fruit passing along the runway. The reflector which is adjustable for fruits of different general diameters is held in the frame 12 at the proper distance from the runway and at the desired angle by set screws 19 or by knuckle joints and the like.

By this arrangement, all portions of the fruit surfaces are exposed to the eye of the operator, readily enabling him to note damaged or defective fruit and remove the same from the runway. If desired the reflector may be suitably curved as shown in dotted lines in Fig. 3 to show an enlarged image.

In Fig. 4 a modified form is shown consisting of two reflectors 20 and 21 to show the entire fruit surface by two images in the same reflector. These reflectors are located at the sides of the runway, so that in cross sectional view, the transparent bottom 15ª of the runway is the bar of an inverted letter A, whose reflector sides form an angle of, or about 60°.

Where it is necessary to use the machine in poorly lighted quarters small electric light bulbs may be attached below or at the sides of the runway to illuminate portions of the fruit which otherwise would be in shadow.

In operation the fruit to be sorted is fed on to the runway at one end in any suitable manner and the graded fruit leaving the other end of the runway is conveyed to any suitable place of discharge.

Having thus described my invention, what I claim as new and desire to protect by Letters Patent is:

1. A sorting apparatus comprising a supporting structure provided with a runway, the bottom of which is transparent at least in part, and a reflecting surface viewed through the said transparent bottom.

2. A sorting apparatus comprising a supporting structure provided with a runway the bottom of which is transparent at least in part, and a magnifying reflector arranged to show the reverse side of the fruit through the transparent bottom which would otherwise be hidden to the eye of the operator.

3. A sorting apparatus including a runway and an endless conveyer comprising a transparent bed, spaced endless chains, and pushers connected and movable on the bed to and extending between the chains to sweep the articles along the runway.

4. A fruit sorting apparatus comprising a runway having a transparent bed, and a conveyer having means for keeping the runway bed clean and transparent.

5. A fruit sorting apparatus comprising the combination of reflecting means for showing the normally concealed sides of fruit without the necessity for turning same and a conveyer for carrying fruit past the reflecting means having a transparent bed through which the reflecting means may be viewed.

6. A sorting apparatus including a support having a transparent surface over which the articles are shifted, and a reflecting surface viewable through said surface whereby the under surfaces of the articles may be seen without turning the articles.

7. A sorting apparatus including reflecting means, and transparent means for movably supporting articles adjacent to the reflecting means to permit of simultaneous view of all portions of the articles without turning the same.

8. A sorting apparatus including a support having a transparent surface over which the articles are shifted, and a reflecting surface viewable through said surface whereby the under surfaces of the articles may be seen without turning the articles, the said reflecting surface being convexly curved whereby the reflected image will be magnified.

In testimony whereof I have affixed my signature.

ERNEST D. CLARK.